United States Patent
Pape et al.

(10) Patent No.: US 10,132,659 B2
(45) Date of Patent: Nov. 20, 2018

(54) SYSTEM FOR PROCESSING MEASUREMENT DATA AND/OR MEASUREMENT PARAMETER DATA

(75) Inventors: Klaus Pape, Wuppertal (DE); David Waind, Rosrath (DE); Horst Butanowitz, Kempen (DE); Michael Backhaus, Dortmund (DE)

(73) Assignee: EDUARD WILLE GMBH & CO. KT, Wuppertal (DE)

( * ) Notice: Subject to any disclaimer, the term of this patent is extended or adjusted under 35 U.S.C. 154(b) by 775 days.

(21) Appl. No.: 14/001,951

(22) PCT Filed: Feb. 28, 2012

(86) PCT No.: PCT/EP2012/053382
§ 371 (c)(1),
(2), (4) Date: Nov. 21, 2013

(87) PCT Pub. No.: WO2012/116998
PCT Pub. Date: Sep. 7, 2012

(65) Prior Publication Data
US 2014/0067328 A1   Mar. 6, 2014

(30) Foreign Application Priority Data

Mar. 3, 2011  (DE) .................. 10 2011 001 074

(51) Int. Cl.
*G01D 9/00* (2006.01)
*B25B 23/142* (2006.01)
*G01L 25/00* (2006.01)
(Continued)

(52) U.S. Cl.
CPC .......... *G01D 9/00* (2013.01); *B25B 23/1425* (2013.01); *G01D 9/005* (2013.01); *G01L 25/003* (2013.01);
(Continued)

(58) Field of Classification Search
CPC ...................................................... G01D 9/00
(Continued)

(56) References Cited

U.S. PATENT DOCUMENTS 6,338,030 B1 * 1/2002 Senn .................. G01J 3/02
356/213
6,845,279 B1 * 1/2005 Gilmore ............ G05B 19/406
340/426.1

(Continued)

FOREIGN PATENT DOCUMENTS

DE    19847701    4/2000
DE    19854062    11/2000

(Continued)

OTHER PUBLICATIONS

International Business Machines Corp.;"Gigibit Speed Multi-Protocol Chip and Adapters for Network Computing"; vol. 40, Nr:10, pp. 13-15.

*Primary Examiner* — Manuel L Barbee
*Assistant Examiner* — Raymond Nimox
(74) *Attorney, Agent, or Firm* — Grogan, Tuccillo & Vanderleeden, LLP

(57) ABSTRACT

The invention relates to a system (100) for processing measurement data and/or measurement parameter data which are read from a calibratable tool. The invention is characterized in that said system comprises a data conversion device (11) or protocol conversion device which, on the one hand, can be connected to a tool (10) via an interface in order to read the measurement data from the tool (10), and which, on the other hand, can be connected to a data processing device (12) via the same interface or an additional interface, wherein the data conversion device (11) performs a protocol conversion and/or a check of the measurement values so that measurement data from the different tools (10*b*, 10*c*, 10*d*) can be read with the aid of different interfaces and/or protocols by the data conversion device (Continued)

(11), the system thus allowing the use of tools with different protocols.

12 Claims, 1 Drawing Sheet

(51) Int. Cl.
*H04L 12/64* (2006.01)
*H04Q 9/00* (2006.01)
(52) U.S. Cl.
CPC .......... *H04L 12/6418* (2013.01); *H04Q 9/00* (2013.01); *H04Q 2209/84* (2013.01)
(58) Field of Classification Search
USPC ........................................................ 702/187
See application file for complete search history.

(56) References Cited

U.S. PATENT DOCUMENTS

| | | | | |
|---|---|---|---|---|
| 2004/0230386 A1* | 11/2004 | Peters | ................... | G01D 9/005 702/57 |
| 2006/0241784 A1* | 10/2006 | Fredriksson | ........ | H04L 12/2602 700/17 |
| 2009/0222222 A1* | 9/2009 | Lucke | ................... | G01L 25/003 702/41 |
| 2010/0170369 A1* | 7/2010 | Yokoyama | .......... | B25B 23/1425 81/467 |
| 2010/0170370 A1* | 7/2010 | Yokoyama | .......... | B25B 23/1425 81/479 |
| 2010/0312930 A1 | 12/2010 | Yamagata et al. | | |
| 2013/0319704 A1* | 12/2013 | Junkers | ............... | B25B 23/1453 173/1 |

FOREIGN PATENT DOCUMENTS

| | | |
|---|---|---|
| DE | 19961374 | 6/2001 |
| DE | 10104143 | 8/2002 |
| DE | 202008002913 | 5/2008 |
| EP | 1151821 A2 | 11/2001 |
| JP | 8118251 | 5/1996 |
| JP | 2009146224 | 7/2009 |
| WO | 2012117032 A1 | 9/2012 |

* cited by examiner

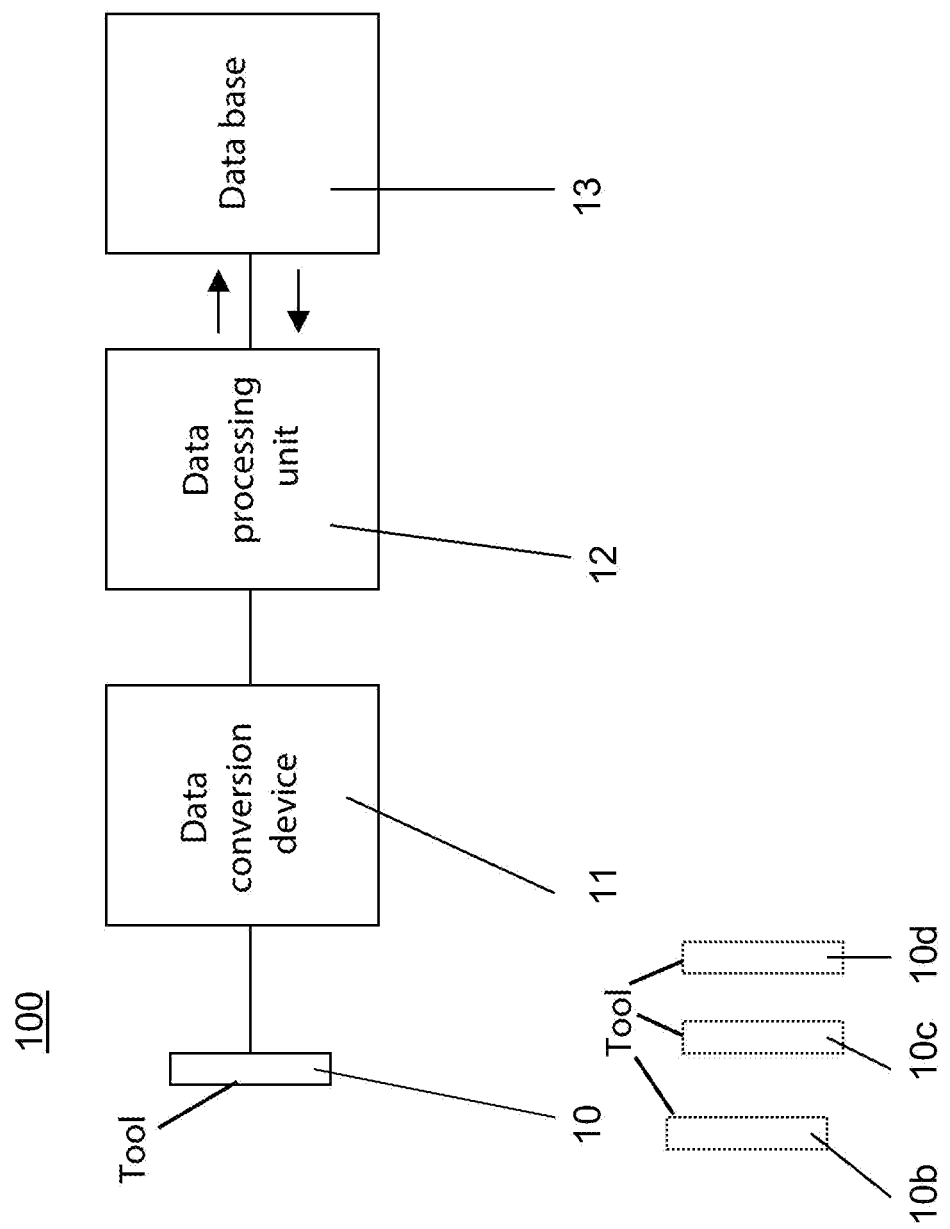

SYSTEM FOR PROCESSING MEASUREMENT DATA AND/OR MEASUREMENT PARAMETER DATA

TECHNICAL FIELD

The invention relates to a system according to the preamble of claim 1.

When reading data from different tools there is the problem that different interfaces are required. Also different protocols may cause problems when establishing the data connection so that systems are not compatible with one another.

STATE OF THE ART

In the DE 198 54 062 C1 a method and a device for ascertaining the pretensioning force of screw connections has been disclosed. This is utilized in safety-relevant installations such as in nuclear power plants, in which it is often desirable to accurately maintain the pretensioning force and record the tightening operation. This is done using a capacitive sensor, wherein the electrical connection of the sensor with a measuring electronics is realised via a plug. A microprocessor system is equipped with a standard PC interface for transferring the measurement data to a PC or laptop.

In the DE 199 61 374 A1 a device for producing screw connections is described. This comprises a device for specifying a parameter of the screw connection and a measuring device for recording and maintaining the parameter. Furthermore an external data processing and data storing unit and a transfer stretch between the device and the data processing and data storing unit is present, whereby the parameter for the screw connection is communicated by the data processing and data storing unit via the transfer stretch.

DISCLOSURE OF THE INVENTION: REQUIREMENT, SOLUTION, ADVANTAGES

The invention is based on the requirement to create a system which permits the use of tools with different protocols.

This requirement is met by a system with the characterising features of claim 1 in conjunction with its features of the preamble.

The system according to the invention permits the execution of a method, so to speak a "tool usage method", for collecting, processing and/or forwarding data from different tools with the aid of different interfaces and protocols. The data may be transferred of forwarded bi-directionally. The tools produce measured values and/or store the same in the tool itself. In addition the tools may be subject to a calibrating interval. Collecting, processing and/or forwarding (bi-directionally) of data is performed by the data processing unit.

The invention could also be designated as a universal hub, access point or protocol converter. What is actually used is a device or an accessory unit for protocol conversion, or a checking device.

Due to the invention setting errors by a user or transfer errors may be detected by means of a check using the checking device.

In addition measured values and other data may be automatically documented and further evaluated. Due to the automation according to the invention or the electronic product according to the invention efficiency is improved.

A further advantage of the invention consists in that measurement errors, the assessment of measuring accuracy and the impact of measuring uncertainty are reduced on site by employing calibration data and directly ascertained results of checks. A further increase in protection is possible if the check is performed and valuated on site prior to and after the application.

The invention can be employed on devices for ascertaining the pretensioning force of screw connections. In particular it is very advantageous to use the device in safety-relevant installations, in particular in nuclear power plants or in the aerospace industry. Here close adherence to the pretensioning force and recording of the tightening operation is required. It is possible to use microprocessor systems with a standard PC interface for transferring the measurement data to a PC or laptop.

A measurement unit for recording and maintaining a parameter may be used in the system according to the invention. The system may comprise an external data processing and data storing unit and a transfer stretch between the device and the data processing and data storing unit.

Prior to its use the device according to the invention can be additionally checked using a checking device in accordance with process regulations. The previously communicated settings and/or set values are recorded in advance and checked and reported back via the data processing unit. It is possible to check as to whether a user has correctly adjusted the tool or whether the values have been correctly electronically adopted.

Data can be converted and forwarded to the data processing unit. The unit documents and evaluates this data and makes decisions on further measures and/or process steps on the basis of the data present. The data processing unit then sends a message back to the relevant user.

The device according to the invention may be subject to calibrating regulations.

Further advantageous designs of the invention are characterised in the sub-claims.

In one advantageous further development of the system according to the invention provision is made for the data processing unit to be connected with a data base and/or in particular further data processing units. In this way a central data base accessible, for example, via the internet, may be created so that central monitoring is possible.

In order to ensure that data can be read out in a simple and convenient manner provision is made in one preferred embodiment according to the invention for the tool measurement data fed into the data conversion device to be read out by a hub such as a USB hub. Alternatively this transfer may take place via radio, e.g. Bluetooth or W-LAN. This means that data of the device can be transferred via cable and/or radio to the hub continuously and discontinuously during or after termination of use. Furthermore several devices may simultaneously provide data, e.g. by several users.

The data from using the tool is present in the hub.

In order to avoid or show up transfer errors it is very advantageous that measurement data is checked within the data processing unit. In this way e.g. screw connections with insufficient torque and an unreliable function can be avoided.

This means that data can be checked for a match prior to producing a screw connection, for example. To this end the data is read e.g. by the hub and checked in the data processing unit. According to an advantageous embodiment the data processing unit can report the device status to the user. The device status may be a state such as readiness, locked and/or OK or not OK. The device status is fed back to the user so that this user can release the plant for use when a status of "OK" has been reported, for example.

It is essential that a check of the tool or its set values is carried out with a test instrument for correctness of settings, whereby a check takes place by the data processing unit (EDV) with feedback to the user or skilled personnel.

With an advantageous further development of the system according to the invention provision is made for the data conversion device to record settings and/or set values, wherein the settings and/or set values are checked by the data processing unit. Due to this extra check transfer errors are detected.

Conveniently a data comparison of calibration data is carried out in the data processing unit. The data processing unit is able to match the data of the last calibration against the data of the check and decide on their use and report back. In this way an extended quality check is possible.

It is particularly favourable if the data conversion device generates and/or stores set values, measured values, time stamps, identification data and/or valuations. Recording of this data is important in the context of safety-relevant areas.

With a further advantageous embodiment of the invention the measurement data comprises torques of screw connections. The data to be used such as screw case parameters can (depending on the embodiment of the device according to the invention) be communicated either directly to the device according to the invention or displayed on a display for the user.

An especially preferred further development of the invention is characterised in that a tool for producing a screw connection is present, which produces the measurement data, in particular a torque wrench. Using the invention false screw parameters can be avoided.

The system according to the invention is used in particular for monitoring the use of a tool. By means of this method it is possible to check who has used which tool and whether the tool has been calibrated. Also, it can be established whether the tool is in a correct calibration state and whether handling the tool was carried out properly during a screwing operation for example.

SHORT DESCRIPTION OF THE DRAWING

One embodiment will now be explained in detail with reference to the drawing, wherein further advantageous further developments of the invention and advantages thereof will be described.

BEST WAY OF EXECUTING THE INVENTION

FIG. 1 shows a system 100 according to the invention. This is used to process measurement data and/or measurement parameter data which is read from a calibratable tool 10. The tool 10 is a tool for producing a screw connection which tool generates the measured torque data. In particular the tool 10 is a torque wrench. The measurement data are thus torques of screw connections.

The system 100 includes a data conversion device 11 or a protocol conversion device. On the one hand the data conversion device has a data connection with the tool 10 via an interface. In this way the measurement data can be read from the tool 10. Via a further interface the data conversion device 11 has a data connection with a data processing unit 12. The data conversion device 11 is so-to-speak an accessory.

The data conversion device 11 may perform a protocol conversion and/or a check of the measured values thus enabling measurement data to be read by the data conversion device 11, which is generated by different tools 10b, 10c, 10d with the aid of different interfaces and/or protocols.

The data processing unit 12 is connected, in particular bi-directionally connected, with a data base 13 and/or further data processing units, as shown in the FIGURE.

The measurement data of the tool 10 or 10b-d fed into the data conversion device 11 can be read by a hub, e.g. a USB hub, or via radio. The measurement data is checked in the data processing unit 12, wherein the data processing unit then reports a device status such as OK or not OK. In addition the data conversion device 11 records settings and/or set values. The settings and/or set values are then checked in the data processing unit 12. Moreover a comparison of calibration data is carried out by the data processing unit 12. The data conversion device 11 can generate and/or store set values, measured values, time stamps, identification data and/or valuations.

The invention is not limited to torque wrenches. Other tools can be connected to the data conversion device 11.

In principle a tool may be any tool requiring calibration including in particular torque wrenches, torque screwdrivers (hand or machine operated) as well as torque sensors as a test specimen or a reference for the calibration unit.

The invention may also be applied to other processes, for example to ultrasound processes or other non-destructive checking operations.

LIST OF REFERENCE SYMBOLS

100 system
10 tool
11 data conversion device
12 data processing unit
13 data base

The invention claimed is:

1. A method for use in safety-relevant installations including nuclear power plants and the aerospace industry, for processing measurement data or measurement parameter data which is read from multiple calibratable tools, wherein the multiple calibratable tools have different interfaces or different protocols, wherein the method comprises the steps of:

providing multiple calibratable tools, at least one of the multiple calibratable tools having an interface or protocol for data storage and transmission that is different from an interface or protocol for data storage and transmission of another of the multiple calibratable tools, connecting a data conversion device (11) to an interface of each of the multiple calibratable tools, the data conversion device being a protocol conversion device, connecting a data processing unit (12) to the data conversion device, with the data conversion device (11), reading measurement data or measurement parameter data from the multiple calibratable tools, with the data conversion device, performing a protocol conversion and a check of measured values so that measurement data from different tools (10 b, 10 c, 10 d) of the multiple calibratable tools, having different interfaces or protocols, can be read with the aid of different interfaces or protocols by the data conversion device (11) when connected to the data conversion device (11), and after performing the protocol conversion at the data conversion device, transmitting the measurement data to the data processing unit so that the measurement data can be read by the data processing unit (12) without having to perform a protocol conversion at the data processing unit (12), with the data processing unit, monitoring the use of the multiple calibratable tools and checking which user has used the calibratable tools;

with the data processing unit, checking as to whether the user has correctly adjusted a tool or whether the measured values have been correctly electronically adopted, and in response to the check, generating an indication of a state of readiness of the tool;

in response to the check, with the data processing unit, locking the tool to prevent use if the check indicates that the tool has not been correctly adjusted or the measured values have not been correctly electronically adopted.

2. The method according to claim 1, characterised in that the data processing unit (12) is connected, in particular bi-directionally, with a data base (13) or further data processing units.

3. The method according to claim 1, further comprising the step of:
reading the measurement data of the tool (10) read into the data conversion device (11) by a hub or via radio.

4. The method according to claim 1, further comprising the step of:
with the data processing unit (12), performing a data comparison of calibration data.

5. The method according to claim 1, further comprising the step of:
with the data conversion device (11), recording settings or set values, and
with the data processing unit (12), checking the settings or set values.

6. The method according to claim 1, further comprising the step of:
performing a check of the tool (10) or of set values of the tool (10) for checking the correctness of settings using a test instrument, wherein the check carried out by the data processing unit (12) involves a feedback message.

7. The method according to claim 1, further comprising the step of:
with the data conversion device (11), generating or storing set values, measured values, time stamps, identification data or valuations.

8. The method according to claim 1, wherein:
at least one of the multiple calibratable tools is a tool (10) for producing a screw connection, in particular a torque wrench generating the measurement data.

9. The method according to claim 1, wherein:
the state of readiness is locked and/or OK, or not OK.

10. The method according to claim 1, wherein:
the measurement data comprises torques of screw connections, and
wherein the method further includes the step of, with the data processing unit, controlling operation of the multiple calibrate tools by communicating data relating to screw connection parameters to the multiple calibrate tools via the data conversion device to produce a screw connection with a predetermined tensioning force.

11. The method according to claim 1, wherein:
the data conversion device (11) is configured so that measurement data of the tool (10) read into the data conversion device (11) is read out continuously by a hub or via radio.

12. A method for use in safety-relevant installations including nuclear power plants and the aerospace industry, for processing measurement data or measurement parameter data which is read from multiple torque wrenches, wherein the multiple torque wrenches have different interfaces or different protocols, wherein the method comprises the steps of:

providing multiple torque wrenches, at least one of the multiple torque wrenches having an interface or protocol for data storage and transmission that is different from an interface or protocol for data storage and transmission of another of the multiple torque wrenches, connecting a data conversion device (11) to an interface of each of the multiple torque wrenches, connecting a data processing unit (12) to the data conversion device, with the data conversion device (11), reading torques of screw connections from the multiple torque wrenches, with the data conversion device, performing a protocol conversion and a check of measured values so that torques of screw connections from different torque wrenches of the multiple torque wrenches, having different interfaces or protocols, can be read with the aid of different interfaces or protocols by the data conversion device (11) when connected to the data conversion device (11), after performing the protocol conversion at the data conversion device, transmitting the torques of screw connections to the data processing unit so that the torques of screw connections can be read by the data processing unit (12) without having to perform a protocol conversion at the data processing unit (12), and with the data processing unit, locking the tool to prevent use if a check indicates that the tool has not been correctly adjusted or the measured values have not been correctly electronically adopted.

* * * * *